United States Patent

[11] 3,624,476

| [72] | Inventors | Raffaello Bruscaglioni<br>Milan;<br>Teodoro Vadala, Monza; Vito Tateo, Milan, all of Italy |
|---|---|---|
| [21] | Appl. No. | 868,805 |
| [22] | Filed | Oct. 23, 1969 |
| [45] | Patented | Nov. 30, 1971 |
| [73] | Assignee | Fabbrica Italiana Magneti Marelli S.p.A.<br>Milan, Italy |
| [32] | Priority | Mar. 25, 1969 |
| [33] | | Italy |
| [31] | | 14505 A/69 |

[54] ELECTRONIC DEVICE FOR REGULATING THE FEED OF A DC MOTOR, ESPECIALLY INTENDED FOR THE ELECTRIC TRACTION OF VEHICLES
5 Claims, 6 Drawing Figs.

[52] U.S. Cl.................................................. 318/345, 321/45 C
[51] Int. Cl..................................................... H02p 5/16
[50] Field of Search............................................ 318/326, 327, 332, 345; 321/452

[56] References Cited
UNITED STATES PATENTS

| 3,337,786 | 8/1967 | Heyman...................... | 318/345 |
| 3,364,409 | 1/1968 | Schuepp...................... | 318/345 |
| 3,365,640 | 1/1968 | Gurwicz...................... | 318/345 |
| 3,374,412 | 3/1968 | Payne.......................... | 318/345 |
| 3,510,744 | 5/1970 | Callan.......................... | 318/332 |

Primary Examiner—Benjamin Dobeck
Assistant Examiner—Thomas Langer
Attorney—Ostrolenk, Faber, Gerb & Soffen ABSTRACT: Regulation of the speed, current and torque of a DC motor is effected by a novel inverter-oscillator combination controlling the charge on a capacitor, the discharge of which serves to block a control diode through which the direct current voltage for the motor is supplied.

INVENTORS
RAFFAELLO BRUSCAGLIONI
TEODORO VADALA
BY VITO TATEO

Ostrolenk, Faber, Gerb & Soffen
ATTORNEYS

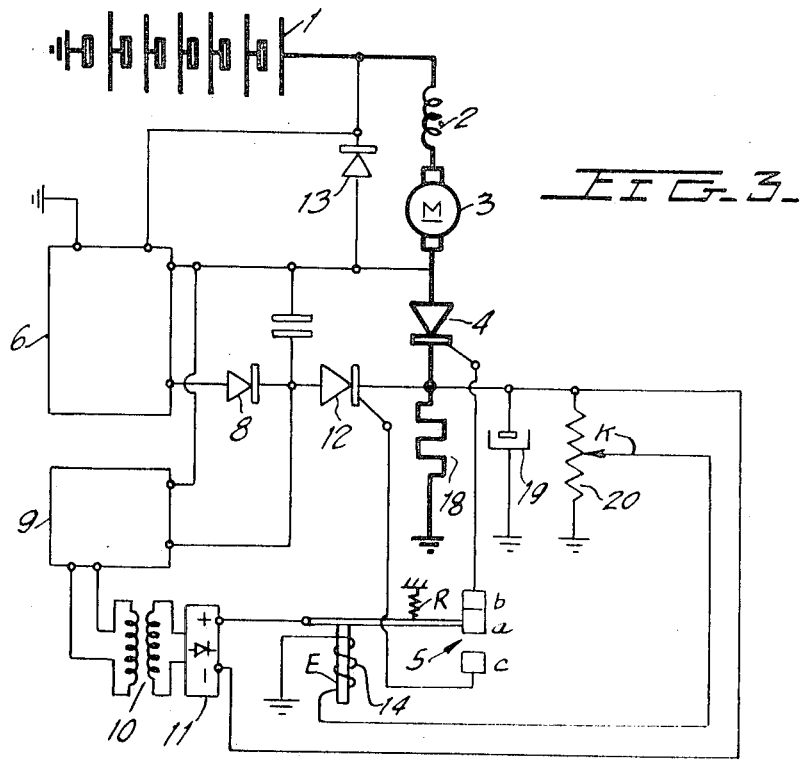
FIG. 3.
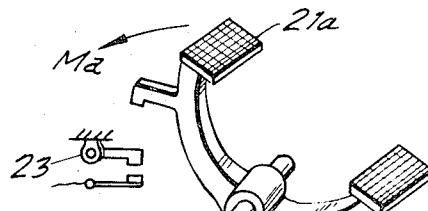
FIG. 6.
INVENTORS
RAFFAELLO BRUSCAGLIONI
TEODORO VADALA
VITO TATEO
BY
Ostrolenk, Faber, Gerb & Soffen
ATTORNEYS
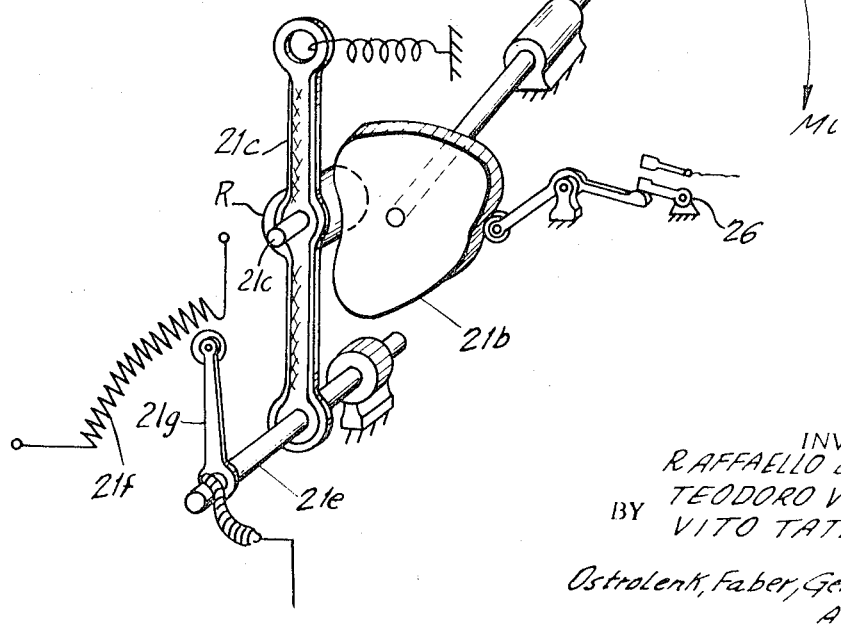

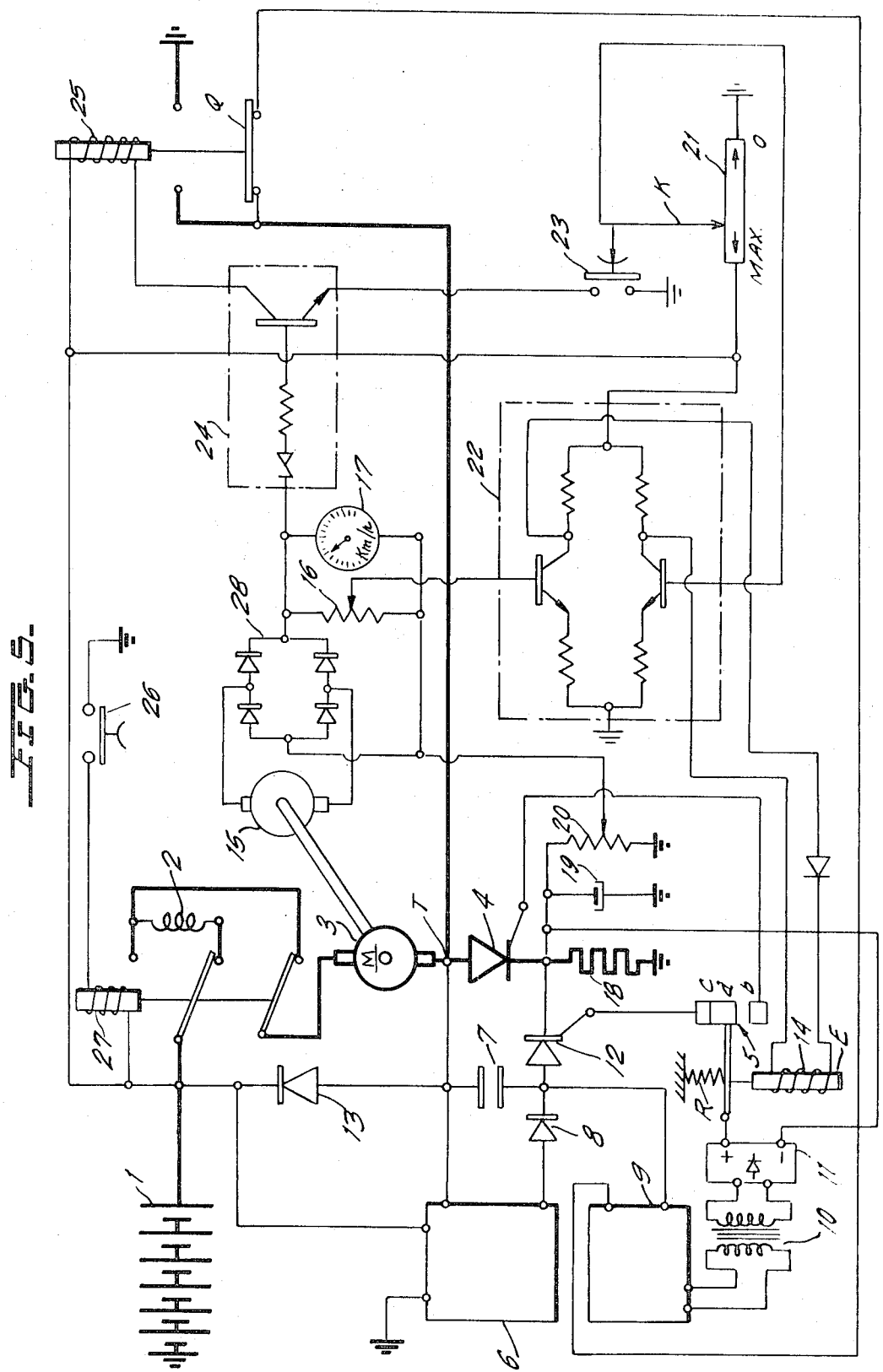

3,624,476

ELECTRONIC DEVICE FOR REGULATING THE FEED OF A DC MOTOR, ESPECIALLY INTENDED FOR THE ELECTRIC TRACTION OF VEHICLES

The present invention relates to an electronic device for regulating the feed of a DC motor which is intended in particular for the electric traction of vehicles.

In known devices of this type, the feeding of the motor is effected via a controlled diode which is blocked by the discharge of a capacitor (disconnect capacitor) which is controlled by a second controlled diode and is charged by the first, during the conduction, via an autotransformer.

The devices of this type, so-called choppers, have various drawbacks, including those due to the difficulty of adjusting the autotransformer and the danger of the capacitor discharging even when its discharge is not sufficient to disconnect the control diode of the motor.

This may happen as a result of a sudden overload of the motor with consequent loss of control of said motor which loses speed or may absorb intolerable currents. Under such circumstances, in order to resume normal regulation, it is necessary to actuate the main switch for the feed.

One object of the present invention is to provide a new electronic regulating device for a DC motor which eliminates the said drawbacks of adjustment and provides maximum certainty of operation. Another purpose is to provide a device which makes it possible to obtain all desired adjustments of the motor by actuating a single operating member such as a foot pedal, handle or hand lever, or the like.

The electronic regulating device which is the subject of the invention is characterized by the fact that the disconnect capacitor is charged by an inverter which in its turn is fed by the same source of current such as the storage battery which feeds the DC motor. Furthermore, the striking signal both at the control diode of the motor and at the control diode of the capacitor is supplied by an oscillator via the switching device.

In accordance with a very important feature of the invention, said oscillator is in parallel with the disconnect capacitor so that the striking signal supplied to the control diode of the capacitor is able to cause the discharge of the latter only when its charge voltage has reached or exceeded a preestablished value.

In this way, upon discharge there is absolute guarantee of the extinguishing of the control diode of the motor and, therefore, of the interruption of the feeding of the latter. The use of the inverter has the advantage of feeding the capacitor at a voltage which is independent of the various operating conditions of the motor.

The switching device which applies the striking signal to the control electrode of one or the other control diode may be of any type, such as electromechanical or electronic. It may also be manually controlled.

In any event, the law by which the device switches the striking signal to one or the other control diode depends on the operating conditions desired of the motor.

Thus, the device will be controlled by a speed sensor if it is desired to effect a regulation of the speed of rotation of the motor. It will be controlled by a current sensor if it is desired to regulate the torque of the motor.

Finally, it will be controlled by speed and current if it is desired to regulate both speed and torque. Such adjustments are effected by acting on a potentiometer by means of a single operating member consisting of a pedal or a lever, or the like. In one simple embodiment, the switching device comprises a contactor which is actuated by an electromagnet which in its turn is controlled by the sensor. In accordance with another feature of the invention, by moving the said operating member all the way under conditions of maximum speed of the motor, it is possible to short circuit the electronic regulating circuit with the advantage of excluding it during operating conditions in which it does not intervene and would constitute only a useless burden. One very important detail resides in the fact that the operating member acts on the wiper of the potentiometer through a transmission comprising a cam which is so shaped that the potentiometer is explored at all times in the same direction whatever the direction of rotation of the operating member.

Further characteristics and advantages of the invention will become evident from the following description and accompanying drawings which, solely by way of illustration and not of limitation, refer to preferred embodiments of the electronic regulating device.

FIG. 3 shows the diagram of FIG. 1 provided with a circuit for regulating the current (torque) of the motor.

FIG. 5 shows the diagram of FIG. 4 with a few variations and provided with circuits for doing away with the electronic regulation of the motor.

FIG. 6 shows in perspective an operating member consisting of a pedal and the drive transmission by which a rheostat is actuated to obtain the regulation of the motor.

Figure 1:
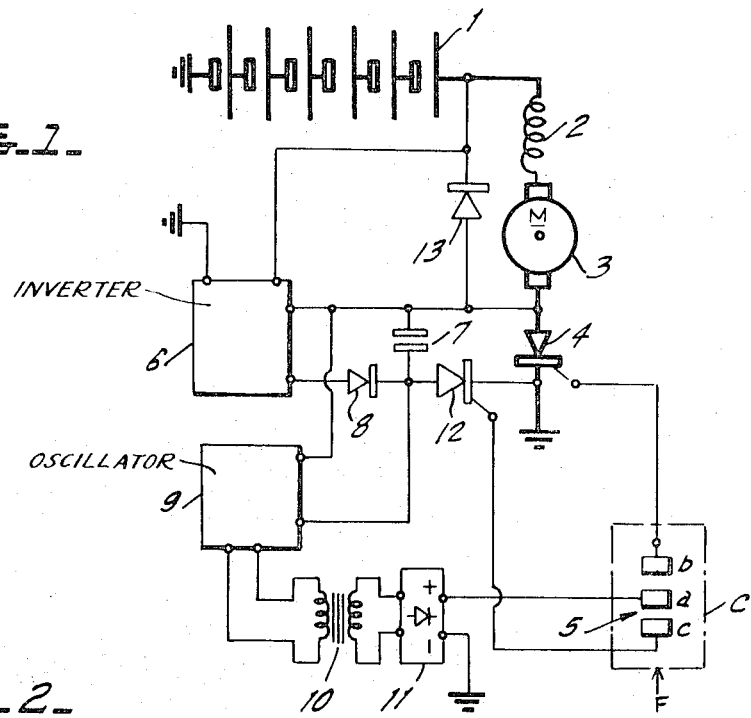
FIG. 1 shows the basic electrical diagram of the regulating device in accordance with the invention.

In the different drawings, identical or corresponding parts have been indicated by the same symbols. 1 is the DC feed source consisting of a storage battery; 2 and 3 are the field winding and the armature, respectively, of the DC motor M; 4 is its controlled diode; and 12 the controlled diode of the capacitor, the discharge of which causes the disconnecting of the diode 4 and, therefore, interrupts the feeding of the motor.

In accordance with the invention, the capacitor 7 is charged via the diode 8 by an inverter 6 which in its turn is fed by the same battery 1 as feeds the motor. Furthermore, the striking signal for the two controlled diodes 4 and 12 is supplied via a switching device C fed by an oscillator 9 via a pulse transformer 10 and a rectifier 11. The inverter 6 and the oscillator 9 oscillate at well-established frequencies.

In accordance with a very important aspect of the invention, the oscillator 9 is connected in parallel with the capacitor 7 and receives the feed of the inverter 6 in such a manner that the striking pulse at the controlled diode 12 produces the discharge of the capacitor only when the charge voltage is greater than a predetermined limit and is, therefore, able definitely to disconnect the controlled diode 4.

In the embodiment of FIG. 1, the switch device C comprises a contactor 5, the movable contact a of which applies the striking signal by switch action to the fixed contacts b and c connected to the control electrode of the controlled diodes 4 and 12, respectively.

The movable contact a is brought into engagement with one or the other of the fixed contacts b and c by the action of a control device, not shown, but indicated symbolically by the arrow F which may be electromechanical or electronic. Under particular circumstances, the operation could be also controlled by hand.

If, at any moment during the conduction of the controlled diode 4 and the consequent feeding of the motor, the contacts a and c are closed, a striking pulse will bring into condition of conduction the controlled diode 12 which, the capacitor 7 discharging, will immediately bring the controlled diode 4 into blocked state, thus interrupting the feed to the motor M. The law by which the movable contact a will be switched to contact b or to contact c will depend on the adjustment which it is desired to obtain. As a matter of fact, by varying the closing times between the contact a and the contacts b and c, there will be varied the duration of the condition of conduction and blocking of the controlled diode 4 and, therefore, the degree of feed of the motor. The diode 13 has the purpose of eliminating the excess voltages which are generated in the motor during the controlled interruptions of the current.

Let us consider now the various possibilities of regulation of the motor illustrated in FIGS. 2 to 5.

CONTROL OF THE SPEED OF THE MOTOR

Figure 2:
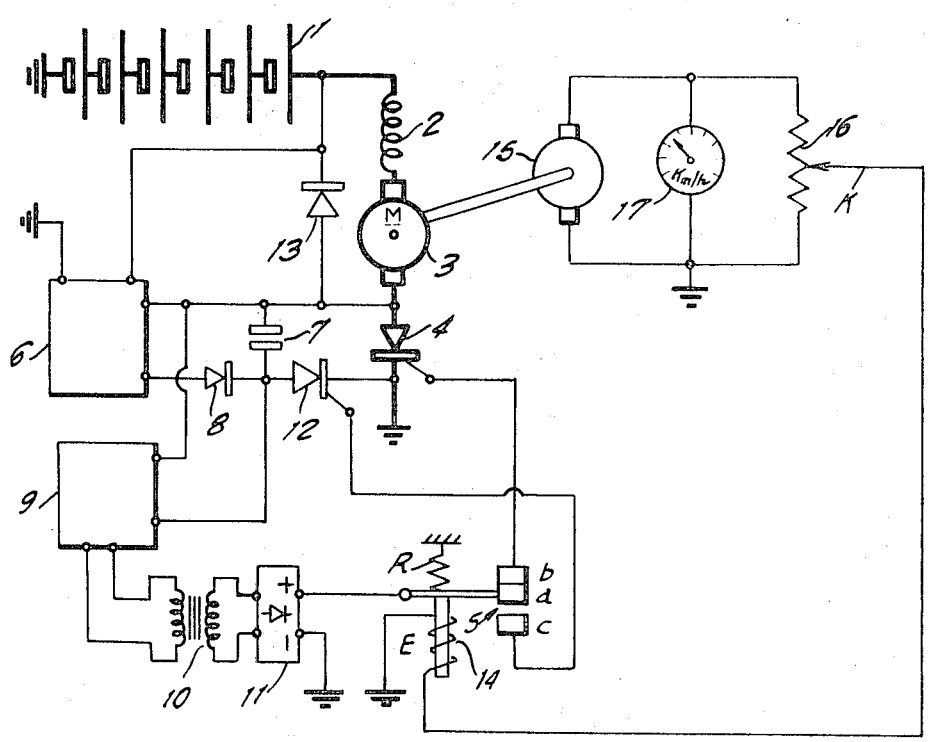
FIG. 2 shows the diagram of FIG. 1 provided with a circuit for regulating the speed of the motor.

This control is illustrated in the diagram of FIG. 2 which differs from that of FIG. 1 by the addition of the electromagnet E which, together with the contactor 5, constitutes the switching device, and furthermore by the presence of the speed sensor consisting of a potentiometer 16 fed by a tachometer generator 15 connected mechanically to the shaft of the motor.

The potentiometer supplies the control voltage to the coil 14 of the electromagnet E via the wiper K. Normally, the contact $a$ is maintained closed by the return spring R on the contact $b$ which is connected to the control electrode of the controlled diode 4. The other fixed contact $c$ is connected to the control electrode of the controlled diode 12. The voltage given off by the tachometer generator 15 varies upon a variation of the speed of rotation and, therefore, the voltage available to the coil 14 will vary upon variation of the position of the wiper K. To each position of the wiper, there will correspond a given speed for the motor.

If the wiper is held in a fixed position, the regulating device will operate as speed limiter. This means that the contact $a$ will be disconnected from $b$ with interruption of the feeding of the motor and closed on $c$ as soon as the motor has reached the maximum speed determined by the position of the wiper on the potentiometer 16. The motor will, therefore, be decreased in speed, the contact $a$ will close again on $b$ and so on with alternate switchings tending to obtain a feeding of the motor which does not cause the speed thereof to exceed the predetermined maximum speed. However, by displacing the wiper K, there is obtained continuous regulation of the speed of the motor. This displacement is effected by pedal or lever which constitutes the sole operating member. It is important to note that the use of a tachometer generator to note the speed of rotation of the motor readily makes it possible to utilize an ordinary voltmeter 17 as revolution counter or tachometer, by suitably developing the scale thereof.

CONTROL OF THE CURRENT (AND TORQUE) OF THE MOTOR

This control is illustrated in the diagram of FIG. 3 which differs from that of FIG. 2 by the presence of a current sensor instead of the speed sensor.

The current sensor is formed by the potentiometer 20 connected in parallel to the resistor 18 in series with the motor, behind the controlled diode 4.

There is also indicated by K the wiper of the potentiometer which taps the control voltage of the coil 14.

Similarly, with wiper K in a fixed position, the regulating device will operate as maximum current limiter (or maximum torque limiter). Wiper K displaceable (i.e., by a pedal or level operating member); there will, however, be continuous regulation of the current or torque.

The current absorbed by the motor through the controlled diode 4 causes, upon passage through the resistor 18, a drop in voltage which is applied to the potentiometer 20. By varying the position of the wiper K, it is possible to vary as desired the current absorbed by the motor both at any speed of rotation and with the armature 3 blocked.

To a fixed position of the wiper of the potentiometer 20, there will correspond for the motor a given amount of absorbed current (even with armature blocked), the stability of which and the sensitivity and variation of which will depend substantially on the frequency of vibration of the moving unit of the contactor 5. The capacitor 19 is for the purpose of filtering the instantaneous voltage peaks due to the discharge of the capacitor 7 through the controlled diode 12 over the resistor 18.

CONTROL OF THE SPEED AND TORQUE OF THE MOTOR

Figure 4:
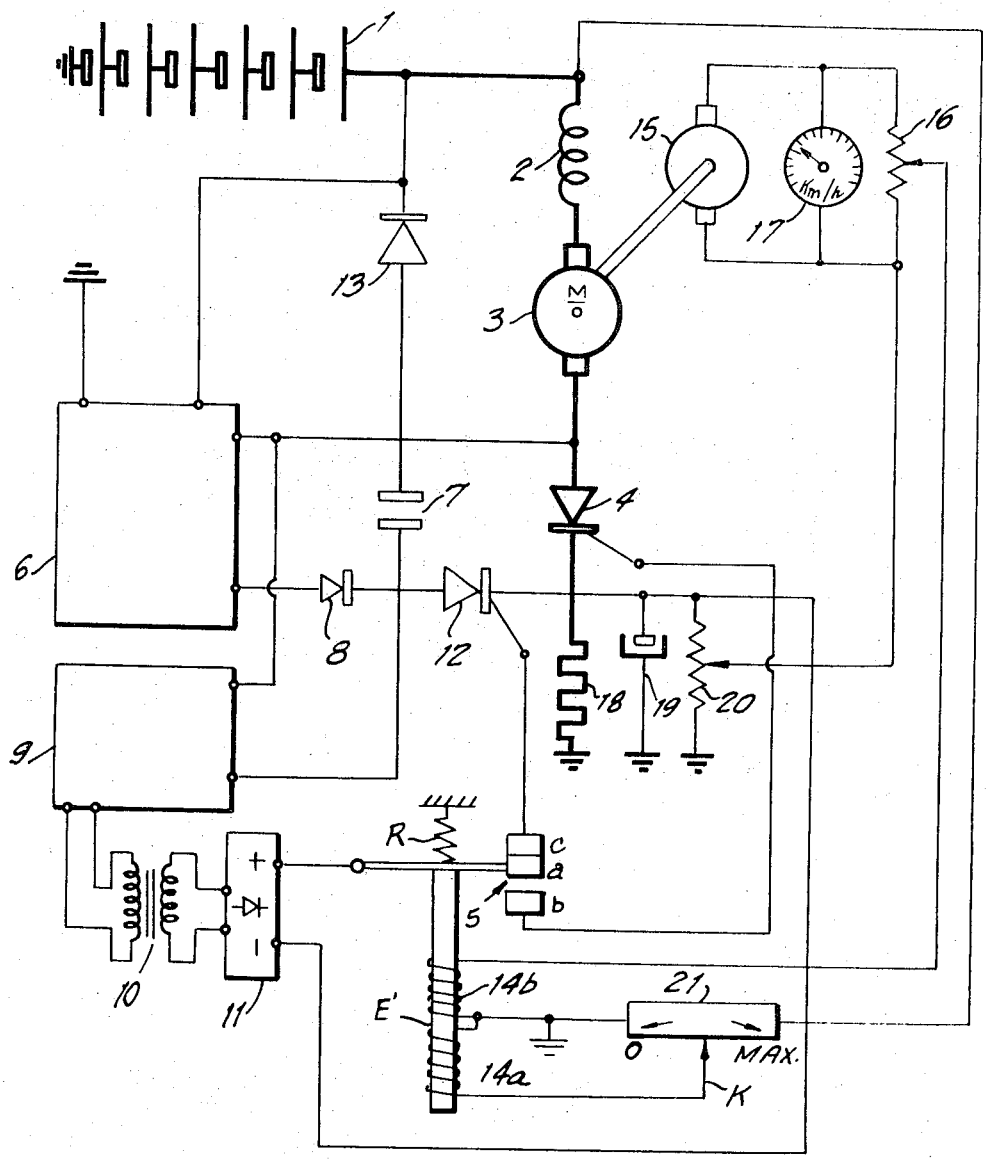
FIG. 4 shows the diagram of FIG. 1 provided with a circuit for regulating both the speed and the current (torque) of the motor.

The electrical diagram for speed and torque control is shown in FIG. 4, and the control is effected by acting on the electromagnet E' with the aid of the speed sensor 15–17, the current sensor 18–20 and the potentiometer 21 actuated by the operating member. The contact $a$ is normally closed on $c$ and the electromagnet E' comprises two coils 14$a$ and 14$b$ fed in opposition. Initially, the wiper K of the potentiometer 21 having been brought into a null position, no current will pass through the motor, since the controlled diode 4 is blocked. By shifting said wiper towards the maximum position by the use of the operating member, the coil 14$a$ of the electromagnet E' will be energized and the engagement of the contacts $a$ and $b$ will cause the controlled diode 4 to become conductive.

The motor will absorb current and will rotate at a speed which is continuously variable as a function of the position of the wiper K. The second coil 14$b$ energized by the speed sensors (15–17) and current sensors (18–21) will cause a flow in the electromagnet E' in opposition to that of the coil 14$a$. In this way, there will be an alternate closing between the contacts $a$–$c$ and $a$–$b$ with a higher frequency the faster the obtaining of equilibrium in the two flows created in the two coils 14$a$ and 14$b$.

In this case, the wipers of the potentiometers 16 and 20 remain in predetermined fixed positions and establish only the limits of maximum calibration of the speed and current in the motor. The signals of the two sensors agreeing with each other, they can, if necessary, be amplified by suitable electronic amplifiers.

It is furthermore possible to distinguish the difference in level between the signals of the sensors and that of the potentiometer 21 by a simple differential amplifier. In such case, the diagram is that shown in FIG. 5 in which the differential amplifiers indicated by 22 and again the sole coil of the electromagnet for the actuation of the contactor 5 is indicated by 14.

SHORT-CIRCUITING OF THE ELECTRONIC REGULATION

In the device which forms the object of the present invention, the possibility is also provided of doing away with the electronic regulation, as illustrated in FIG. 5.

For this purpose, it is sufficient merely to connect the output terminal T of the motor to ground via a contact Q. However, and this is of substantial importance, this operation is not controlled only by an ordinary limit switch 23 of the operating member such as a pedal since in such case there would be produced a condition of danger when the motor loaded with a high torque (almost blocked) is fed instantaneously with full voltage (erroneous operation corresponding to depressing the pedal all the way). As a matter of fact, the depressing of the pedal all the way which causes the closing of 23 and simultaneously the maximum displacement of the wiper K of the potentiometer 21 does not produce any effect on the feeding of the electronically regulated motor which is maintained as is unless the motor has surpassed a speed of rotation which can be predetermined as desired; only when this condition is reached and 23 is closed does an electronic device 24, composed of a Zener diode and a power transistor which is connected to the tachometer generator 15 permit the energizing of the remote relay operated switch 25 which closes the contact Q in order to obtain the disconnecting of the electronic regulating device and, therefore, the feeding of the motor with full voltage. The action of the remote switch 25 disconnects the electronic oscillator 9 for the entire time that the motor is fed at full voltage, thus preventing the discharge of the capacitor 7. When it is desired to reverse the direction of operation of the motor, it is necessary, after having returned the operating member (pedal) and, therefore, the wiper K of 21 to zero position, to close the switch 26 in order to energize the coil of the remote switch/reversing switch 27 which reverses the direction of feed of the field coil 2.

During operation and when the motor is in reverse, in order to have a voltage of the tachometer generator 15 which is at all times in the same direction, as is necessary for the speed sensor, there is provided at the terminals of the generator a rectifier group 28. In order to avoid any error in manipulation on the part of the operator, the device is provided with an operating member which permits the sequence of all the operations without the possibility of error.

Said operating member is represented in FIG. 6. It consists of the pedal 21a, capable of rotating in one direction Ma, or in the other direction Mi for forward and rearward operation of the motor, respectively. The pedal effects the displacement of the wiper on the rheostat 21 via a drive transmission comprising suitably shaped cam 21b. The cam, which is rotated by pedal 21a, acts on a roller R of an oscillating shaft 21c which in its turn rotates arm 21d to control the rotation of the operating shaft 21e displacing the wiper 21g of the rheostat 21f.

The particular characteristic of the drive transmission consists in the fact that whatever the direction of displacement of the pedal 21a, the wiper of the rheostat moves always in the same direction.

Although this invention has been described with respect to particular embodiments, it should be understood that many variations and modifications will now be obvious to those skilled in the art, and, therefore, the scope of this invention is limited not by the specific disclosure herein, but only by the appended claims.

What is claimed is:

1. A device for electronically regulating a DC motor comprising:
   a DC motor having first and second input terminals;
   a DC source coupled to one terminal of said motor;
   first and second controlled diodes each having first and second electrodes and a control electrode;
   the first electrode of said first controlled diode being connected to the second terminal of said motor;
   a capacitor connected between the second terminal of said motor and the first electrode of said second/controlled diode;
   the second electrodes of said first and second controlled diodes being connected in common;
   inverter means having its input coupled to said power source and its output coupled across said capacitor;
   oscillator means coupled to said capacitor and being energized when said capacitor charges to a predetermined level;
   means for rectifying the output of said oscillator;
   selective switch means for coupling the output of said rectifier means to the control electrodes of either said first or said second controlled diode for respectively energizing or deenergizing said motor.

2. The device of claim 1 further comprising diode means coupled between said inverter means and said capacitor for controlling the polarity of the voltage developed across the capacitor.

3. The device of claim 1 further comprising diode means coupled across the first and second terminals of said DC motor for limiting the current flow through said DC motor.

4. The device of claim 1 further comprising transformer means for coupling the output of said oscillator means to said rectifying means.

5. The device of claim 1 wherein said switch means comprises first and second contacts respectively coupled to the control electrodes of said first and second controlled diodes; and
   movable switch means selectively engageable with said first and second contacts.

* * * * *